July 25, 1967

E. A. ROESKE 3,332,323

ROTARY ACTUATOR

Filed Dec. 28, 1964

Inventor
Eugene A. Roeske
By Robert L. Zieg
Att'y.

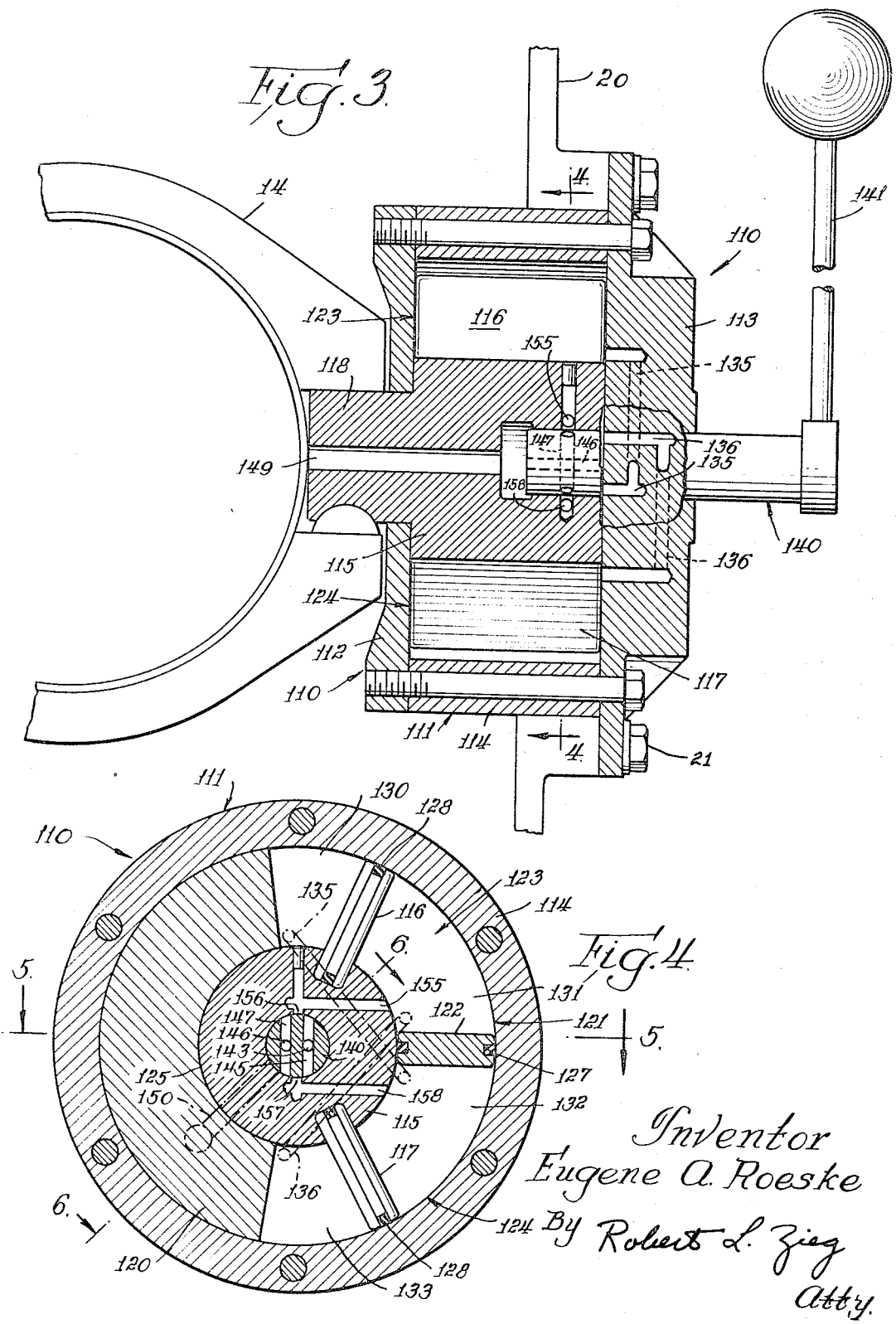

July 25, 1967
E. A. ROESKE
3,332,323
ROTARY ACTUATOR
Filed Dec. 28, 1964
3 Sheets-Sheet 3
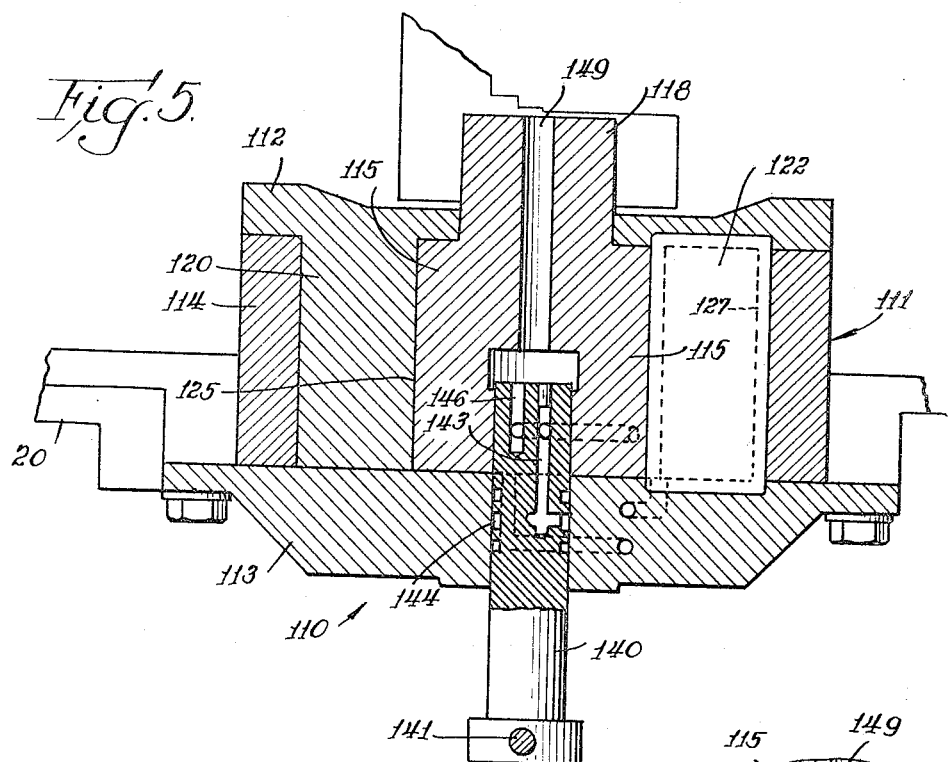
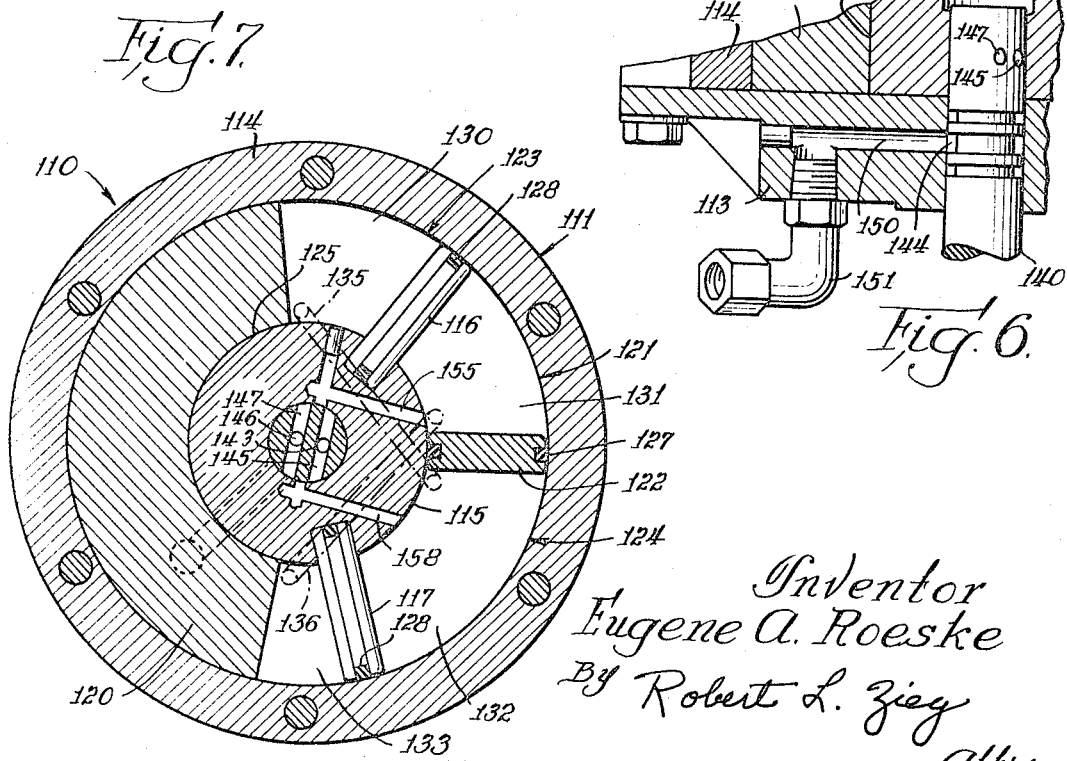
Inventor
Eugene A. Roeske
By Robert L. Zieg
Att'y

# United States Patent Office 3,332,323
Patented July 25, 1967

3,332,323
ROTARY ACTUATOR
Eugene A. Roeske, St. Louis, Mo., assignor to Borg-Warner Corporation, Chicago, Ill., a corporation of Illinois
Filed Dec. 28, 1964, Ser. No. 421,575
4 Claims. (Cl. 91—375)

This invention relates to a control valve mechanism for control of a hydraulic pump or motor.

More particularly, this invention relates to an improved servo control valve mechanism to control the angle of a swash plate of a variable displacement fluid pump or motor in a hydrostatic transmission. The swash plate angle is controlled by a manual lever and the improved servo valve mechanism is provided to move the swash plate.

It is the object of the present invention to provide a rotary servo valve mechanism to control the angle of the swash plate whereby a vane type rotary structure is employed which utilizes a plurality of fluid chambers to actuate the movement of the swash plate in accordance with the position of the manual lever whereby due to the rotary structure and the utilization of a plurality of fluid chambers, the servo valve mechanism may be constructed in a very compact manner utilizing very little space in its environment as compared to known types of servo control mechanisms, while at the same time providing adequate control force to hold or move the swash plate.

The invention consists of the novel constructions, arrangements and devices to be hereinafter described and claimed for carrying out the above stated objects and such other objects as will be apparent from the following description of preferred forms of the invention, illustrated with reference to the accompanying drawings in which:

FIGURE 3 is a sectional view of the rotary servo valve mechanism taken along the line 3—3 of FIGURE 1;

FIGURE 4 is a sectional view taken along the line 4—4 of FIGURE 3;

FIGURE 5 is a sectional view taken along the line 5—5 of FIGURE 4;

FIGURE 6 is a sectional view taken along the line 6—6 of FIGURE 4; and

FIGURE 7 is a view similar to FIGURE 4 illustrating a different control position of the rotary servo valve mechanism.

Figure 1:
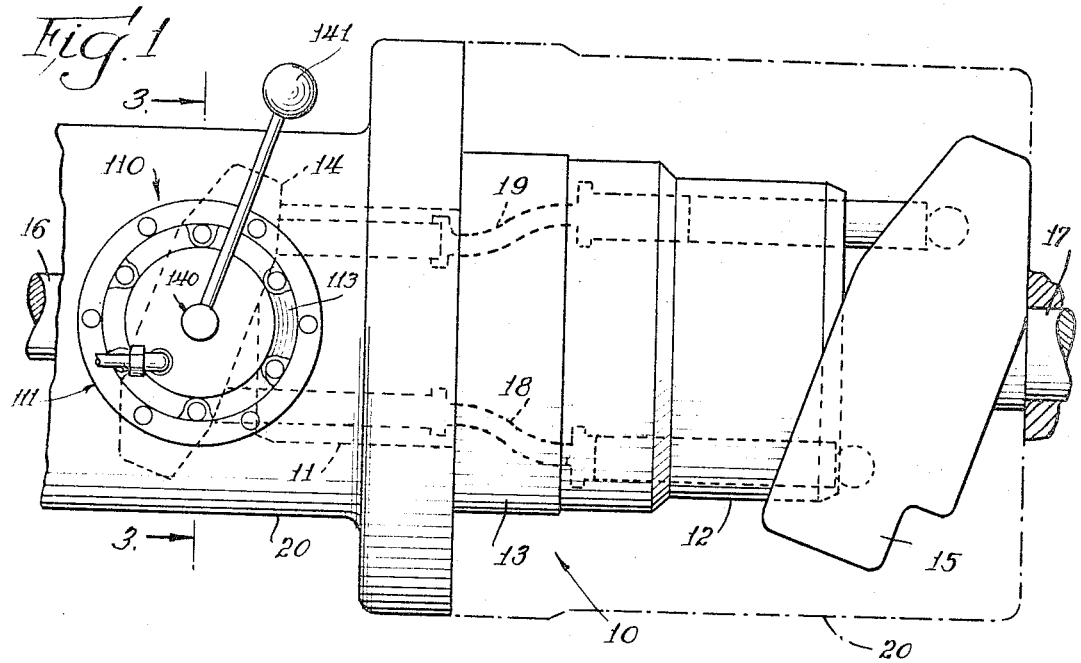
FIGURE 1 is a side view of the hydrostatic transmission embodying the present invention and showing the over-all arrangement of the pump and motor units of the transmission.

The novel and improved servo valve mechanism of the present invention is designed to be used in a hydraulic control circuit for controlling the angle of the swash plate of the pump unit of a hydrostatic transmission of the type shown in FIGURE 1 having a fluid pump adapted to be driven by a prime mover and driving a fluid motor to provide an infinitely variable drive ratio. However, the rotary servo control valve of the present invention may be utilized in other embodiments and constructions where control of the angular position of an element is desired.

The hydrostatic transmission 10 embodying the present invention as illustrated in FIGURE 1 has a fluid pump 11 and a fluid motor 12 mounted within a housing 20. A stationary port plate 13 separates the fluid pump and motor. A variable angle swash plate 14 is provided for the pump and a fixed swash plate 15 is provided for the motor unit. The pump is driven by an input shaft 16 and the motor unit drives an output shaft 17. Fluid passages 18 and 19 in a stationary port plate 13 interconnect the pump and motor units. The transmission illustrated in FIGURE 1 is more particularly described in Patent No. 3,143,858 and in copending application S.N. 379,254, now Patent No. 3,241,317, each of common assignee to the present invention.

Figure 2:
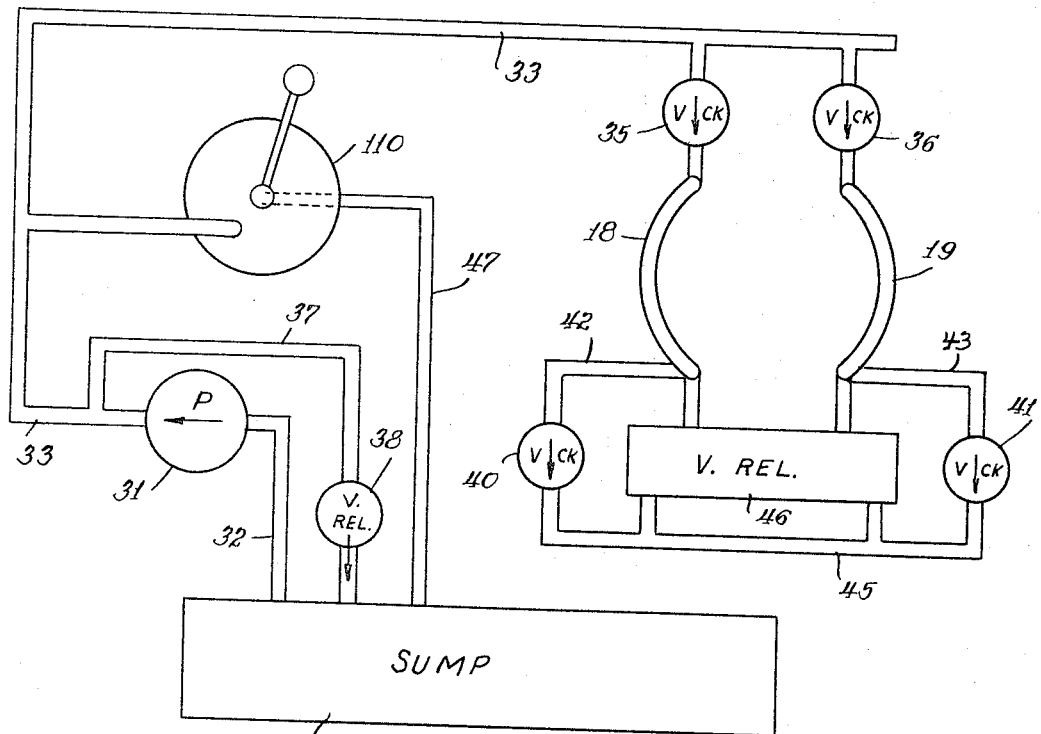
FIGURE 2 is a schematic diagram of the pressure supply fluid control circuit for the transmission of FIGURE 1.

Referring to FIGURE 2 a fluid supply and swash plate control circuit is schematically illustrated. The fluid circuit including the pressure passages which interconnect the pump and motor units is more particularly illustrated in the mentioned Patent No. 3,143,858. The fluid circuit of FIGURE 2 includes a sump 30 and a fluid charge pump 31 which draws fluid from the sump through passage 32. Passage 33 interconnects the output side of the charge pump 31 with the rotary servo control valve 110 of the present invention with a pair of check valves 35 and 36 which are in communication with passages 18 and 19 interconnecting the pump and motor units. Passage 33 is also in communication with a fluid passage 37 leading to a relief valve 38 which will control pressure in the passage 33 and return a portion of the fluid from the charge pump to the sump. The fluid passages 18 and 19 interconnecting the pump and motor units are in communication with a pair of check valves 40 and 41 through passages 42 and 43 respectively.

One or the other of the fluid passages 18 and 19 will be the high pressure passage depending on the direction of rotation of the pump and motor units. Whichever is the high pressure passage will determine which of the check valves 40 or 41 will open and admit high pressure fluid to a fluid passage 45; high pressure fluid in passage 45 will then close the other check valve. In this way the fluid passage 45 will always contain the high pressure fluid within the system. The pressure of the fluid in passage 45 is limited by a relief valve 46 which is in communication with the fluid passages 18 and 19. Fluid passage 47 is provided which connects servo valve 110 with the sump 30.

The fluid passage 33 which is connected to the servo valve will always have a pressure the same as the pressure in whichever of the fluid passages 18 or 19 is the low pressure passage since, whichever of the check valves 35 or 36 is in communication with the low pressure passage will be open and high pressure fluid in the other passage 18 or 19 will close the other check valve. The fluid pressure in the passage 33 is termed charge pressure since it is pressure created by charge pump 31, a function of which is to insure adequate fluid within the passages 18 and 19 interconnecting the fluid pump and motor units of the transmission.

The novel and improved control valve for swash plate 14, rotary servo control valve 110, includes a casing 111 made up of end plate 112, cover member 113 and an annular outer wall 114. As illustrated in FIGURE 3, the valve 110 is secured to the housing 20 by bolts 21 extending through cover member 113. Mounted within the casing 111 is a rotor 115 having vanes 116 and 117. The rotor 115 has a pilot portion 118 which is journalled in the end plate 112. The pilot portion 118 is keyed to swash plate 14 so as to be drivingly connected thereto. Pilot portion 118 conveniently serves as the pivot and supporting structure for one side of swash plate 14.

A generally semi-circular shaped projection 120 is provided on the end plate 112 which projects within the outer annular wall 114 and up against the cover member 113. The projection 120, rotor 115, end plate 112, cover member 113 and annular wall 114 together define a generally semi-circular fluid cavity 121 within the casing 111. A stationary wall or partition 122 is mounted within the fluid cavity 121. The ends of the partition 122 fit in mating recesses in end plate 112 and cover member 113, to secure the partition within the fluid cavity 121 into two smaller fluid cavities 123 and 124.

The outer diameter of the rotor 115 fits within partially annular surface 125 provided in the projection 120 so as to provide a fluid seal between rotor 115 and the surface 125.

A seal ring 127 is provided which fits in a slot around wall 122 to provide a fluid seal between the wall or partition 122 and outer annular wall 114 and the outer diameter of rotor 115.

Likewise, seal rings 128 are provided which fit in slots around the vanes 116 and 117 to provide a fluid seal between the vanes 116 and 117 and annular wall 114.

The vane 116 divides the fluid cavity 123 into fluid pressure chmabers 130 and 131. The vane 117 divides the fluid cavity 124 into fluid pressure chambers 132 and 133. A fluid passage 135 is provided in cover member 113 which interconnects fluid pressure chambers 130 and 132. A fluid passage 136 is provided in cover member 113 which interconnects fluid pressure chambers 131 and 133.

A pilot valve 140 is rotatably journalled within the cover member 113 and rotor 115. The pilot valve 140 is manually rotatable by a handle 141. The pilot valve 140 includes a fluid inlet pressure passage 143 which is in communication with a fluid passage 145 which extends transversely through the pilot valve 140 as viewed in FIGURE 4. The pilot valve 140 also includes a fluid pressure exhaust passage 146 which is in communication with a fluid passage 147 which extends transversely across the pilot valve 140 as viewed in FIGURE 4. The passage 147 is parallel with the transversely extending passage 145. The fluid exhaust passage 146 extends to the left end of the pilot valve 140 as viewed in FIGURE 5 and is in communication with an exhaust passage 149 extending through rotor 115, the passage 149 being adapted to conduct fluid back to the sump 30.

A pressure fluid inlet passage 150 is provided in cover member 113 which is in communication with an inlet pipe 151 as illustrated in FIGURE 6. The inlet pipe 151 is in communication with the pressure supply passage 33 which is connected to the output side of the charge pump 31 of the transmission. Inlet pressure passage 150 is also in communication with the annular groove 144 in the pilot valve 140 thus supplying pressure from the charge pump through annular groove 144 to the pressure inlet passage 143 for the control valve 110.

As illustrated in FIGURE 4, the rotor 115 itncludes a fluid passage 155 terminating with a port 156 in communication with the pilot valve 140, the passage 155 also being in communication with the fluid pressure chamber 131. Rotor 115 also includes a fluid passage 158 in communication with the fluid chamber 132 and with a port 157 adjacent the pilot valve 140. The ports 156 and 157 are 180° displaced with respect to each other.

In the operation of applicant's device, when the handle 141 is rotated or arcuately displaced in either direction to arcuately displace the pilot valve 140, the rotor 115 will follow the movement of the pilot valve 140 and thus place the swash plate 14 in an arcuate position corresponding to the position of handle 141.

For example, when the pilot valve is rotated clockwise as illustrated in FIGURE 4 the fluid inlet pressure from the charge pump will be communicated from passage 150 through annular groove 144, passage 143, passage 145, port 157, and passage 158 to the fluid pressure chamber 132. Fluid pressure in the chamber 132 will also be communicated to the pressure chamber 130 by means of the fluid passage 135 in cover member 113.

The clockwise movement of the pilot valve will also place passage 147 in communication with pressure chamber 131 and through passage 136 in communication with pressure chamber 133. Fluid pressure thus existing in fluid pressure chambers 131 and 133 will be exhausted through passage 155, port 156, passage 147, passage 146 and passage 149 to the sump 30.

Thus the chambers 130 and 132 are connected to fluid pressure and chambers 131 and 133 will be connected to exhaust. The fluid pressure in chambers 130 and 132 will apply force to the vanes 116 and 117 to move them clockwise thereby moving rotor 115 clockwise. The valve 110 has a self-limiting feature in that the rotor 115 will move clockwise until a position, as illustrated for example in FIGURE 7, is attained wherein the are of pilot valve 140 between passages 147 and 145 blocks the fluid passages 155 and 158 in the rotor 115. Thus for each arcuate movement of the pilot valve 140, the rotor 115 will follow and will stop when angularly aligned with the pilot valve 140 as represented in FIGURE 7.

From the above it will be apparent that applicant has provided a novel and improved type of servo control mechanism for positioning the swash plate of a fluid pump or motor in response to arcuate movement of a manual means. Due to the use of two pressure chambers and two fluid vanes a very compact servo control valve mechanism can be provided, as compared to known prior art devices using reciprocating piston types of servo control valves, while still maintaining adequate force to control and hold the swash plate.

Further, the rotary servo valve of the present invention is mounted in the housing of the transmission and provides one of the journals for the swash plate thus saving space within a transmission as opposed to the known types of servo mechanism for controlling the angular position of a swash plate which utilize a reciprocating pilot valve and piston structure.

Further, applicant's novel and improved rotary servo control valve is so designed that the swash plate will follow closely the arcuate position of the manually operated pilot valve providing arcuate positioning of the swash plate due to the self-limiting feature in that when the rotor 115 attains the proper position it automatically blocks the fluid communicating passages to stop angular movement of the rotor.

I wish it to be understood that my invention is not to be limited to the specific constructions and arrangements shown and described herein except only insofar as claims may be so limited as it will be understood by those skilled in the art that changes may be made without departing from the principles of the invention.

I claim:

1. In a fluid pump or motor having a plurality of reciprocal pistons, a swash plate engaging said pistons, said swash plate being pivotable about an axis to vary the displacement of said pump or motor, a rotary control valve for the swash plate comprising a casing, a rotor having a plurality of vanes thereon mounted in said casing, said rotor having a pilot portion thereon, said pilot portion being rotatable about said axis and drivingly connected to said swash plate, said pilot portion comprising a journal for said swash plate whereby rotary movement of said rotor will pivot said swash plate about said axis, said casing including means defining a fluid cavity for each of said vanes, said vanes dividing each of said cavities into two fluid pressure chambers, arcuately displaceable means mounted within said rotor adapted to connect one of said pressure chambers for each of said vanes to a source of fluid pressure and the other chamber for each of said vanes to exhaust whereby said rotor will follow arcuate movement of said arcuately displaceable means to change the arcuate position of the swash plate in accordance with the arcuate position of said arcuately displaceable means.

2. A mechanism as claimed in claim 1 wherein said arcuately displaceable means comprises a pilot valve rotatably mounted within said rotor.

3. A mechanism as claimed in claim 2 wherein said pilot valve includes fluid passage means in communication with a source of fluid pressure and fluid passage means in communication with said exhaust passage in said rotor.

4. A mechanism as claimed in claim 3 wherein said rotor is adapted to block said fluid pressure and exhaust passages in said pilot valve from communication with said fluid pressure chambers when said rotor is in an arcuate position corresponding to the arcuate position of said pilot valve.

References Cited
UNITED STATES PATENTS

| | | | |
|---|---|---|---|
| 1,876,104 | 9/1932 | Tucker | 91—375 |
| 2,260,979 | 10/1941 | Morin et al. | 92—122 |
| 2,613,649 | 10/1952 | Diebel | 91—375 |
| 2,847,938 | 8/1958 | Gondek | 103—162 |
| 2,954,830 | 10/1960 | Gehres | 91—375 |
| 2,960,970 | 11/1960 | Boyle et al. | 91—375 |
| 3,139,006 | 6/1964 | Budzich | 91—199 |
| 3,139,037 | 6/1964 | Budzich | 103—162 |

MARTIN P. SCHWADRON, *Primary Examiner.*
PAUL E. MASLOUSKY, *Examiner.*